United States Patent Office 3,227,712
Patented Jan. 4, 1966

3,227,712
HYDANTOIN DERIVATIVES OF
CEPHALOSPORIN C
Arthur A. Patchett, Metuchen, and Stanton A. Harris,
Westfield, N.J., assignors to Merck & Co., Inc., Rahway,
N.J., a corporation of New Jersey
No Drawing. Filed Apr. 9, 1963, Ser. No. 271,606
8 Claims. (Cl. 260—243)

This is a continuation in part of application Serial No. 83,925, filed January 23, 1961, and now abandoned.

This invention relates to new products having antibiotic activity and methods of preparing the same. More particularly, it is concerned with hydantoin derivatives of cephalosporin C and processes for the preparation of these derivatives.

The antibiotic substance cephalosporin C and its preparation by fermentation of suitable species of Cephalosporium has been described in the art. This antibiotic, which has been found to have the following structure

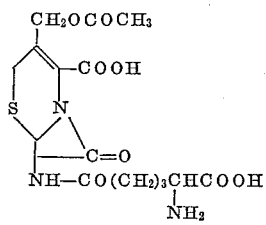

is active against both gram positive and gram negative bacteria.

It is an object of this invention to provide new hydantoin derivatives of cephalosporin C having enhanced antibiotic activity. Another object of this invention is to provide N-carbamyl derivatives of cephalosporin C, processes for the preparation of these derivatives, and processes for the conversion of the carbamyl derivatives to hydantoins. A further object is to provide heterocyclic derivatives of the hydantoin compounds which are characterized by high antibiotic activity. Other objects will be apparent from the detailed description of our invention hereinafter provided.

In accordance with one embodiment of the present invention, it is now found that cephalosporin C and its derivatives can be converted to the N-carbamyl derivatives and these derivatives converted to the corresponding hydantoin compounds by procedures which can be illustrated structurally as follows:

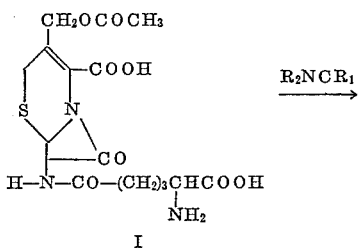 $\xrightarrow{R_2NCR_1}$

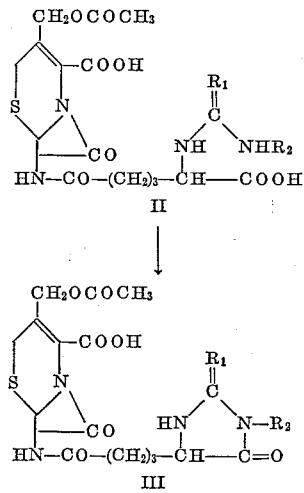

wherein $R_1$ is oxygen or sulfur and $R_2$ is a hydrocarbon.

In accordance with the above-described procedure, cephalosporin C or a derivative thereof is reacted with an ester of isocyanic or isothiocyanic acid in the presence of a mild base to produce the corresponding N-carbamyl compound (II). Reaction of this carbamyl derivative with an acid effects elimination of water and forms the desired hydantoin compound (III) in accordance with the second step of the above-described procedure.

The first step of this process is conveniently effected by intimately contacting the ester of isocyanic or isothiocyanic acid with cephalosporin C in an aqueous medium in the presence of a mild base at room temperature. In carrying out this reaction, the isocyanic acid ester or the isothiocyanic ester is preferably added to the aqueous solution of a water soluble salt of cephalosporin C; the reaction being conveniently effected in the presence of a suitable water miscible organic solvent for the ester such as dioxane and the like. Alternatively, a solution of the isocyanic or isothiocyanic ester in a suitable water miscible solvent can be added to the aqueous solution of cephalosporin. After the completion of the reaction, the desired N-carbamyl compound is recovered by acidifying the aqueous reaction mixture or by extracting the acidified mixture with a water immiscible solvent for the acid such as butanol. If desired, the carbamyl compound can be further purified by crystallization from suitable solvents or solvent mixtures in accordance with procedures well known in this art.

The N-carbamyl derivatives of cephalosporin C so prepared can be readily converted to the corresponding hydantoin compounds by reaction with an acid to effect elimination of water and form the desired hydantoin. Thus, this step is most conveniently effected by heating the carbamyl compound with acetic acid for a time sufficient to complete the formation of the hydantoin, and then evaporating the resulting reaction mixture under reduced pressure. The product obtained in this way can be further purified by crystallization from suitable solvents or solvent mixtures to produce the hydantoin in pure form.

In general, substituted or unsubstituted alkyl, aryl or arylkyl esters of isocyanic acid or isothiocyanic acid wherein the alkyl, aryl or arylkyl group has a chain length of from one to ten carbon atoms can be utilized in accordance with the foregoing described procedures to produce the corresponding hydantoin derivatives of cephalosporin C. Examples of suitable esters that might be mentioned include alkyl esters such as methyl, ethyl, propyl, butyl, hexyl, heptyl and the like, aryl esters such as phenyl, napthyl and the like, and arylkyl esters such as benzyl, phenylethyl and the like. These alkyl, aryl and arylkyl groups can contain other substituents such as hydroxyl, halogen and nitro substituents.

Pursuant to a further embodiment of our invention, ring closure of the N-carbamyl compounds can be effected by reaction with acylating agents such as acetic anhydride to produce the corresponding acylated hydantoin derivatives. This reaction may be illustrated as follows:

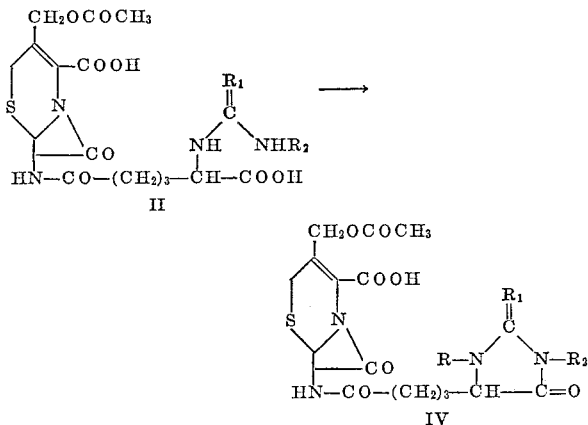

wherein $R_1$ and $R_2$ are the same as described above and R represents an acyl group.

Although various acylating agents can be used in carrying out this reaction, it is preferred to effect the reaction with an anhydride of a lower alkanoic acid such as acetic anhydride, propionic anhydride and the like. Thus, the reaction is conveniently carried out by intimately contacting the carbamyl compound with acetic anhydride in the presence of a small amount of pyridine. After completion of the reaction, the acylated hydantoin derivative is recovered by removing the solvent under reduced pressure, dissolving the residue in water, acidifying the aqueous solution, extracting the acylated hydantoin with a water immiscible solvent, and concentrating the resulting extracts.

The acylated hydantoins obtained in accordance with the above-described procedure can be deacylated by treatment with acid to produce the unacylated hydantoin compound. Thus, this provides an alternative method for the preparation of the hydantoin compounds. The preparation of acylated hydantoins of cephalosporin C by this method is especially useful since it is possible to obtain high yields of the acylated products by this process.

The acylated hydantoin compounds are valuable compounds having bactericidal activity and are useful bacteriocides in addition ot being useful as intermediates in the production of the hydantoin compounds.

Alternatively and in accordance with another embodiment of this invention, the acylated hydantoin compounds are also prepared by reacting the hydantoin compounds with suitable acylating agents such as acid anhydrides and acid chlorides. For example, the hydantoin and thiohydantoin compounds are acetylated by reacting these products with acetic anhydride in glacial acetic acid in the presence of a small amount of pyridine.

Pursuant to a further embodiment of this invention, the hydantoin and acylated hydantoin derivatives of cephalosporin C can be further reacted with heterocyclic bases to produce the corresponding heterocyclic base derivatives of the hydantoin of desacetoxy cephalosporin C. This product may be shown structurally as follows:

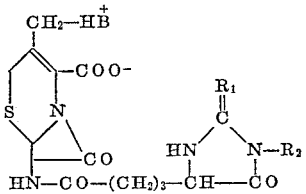

where $R_1$ and $R_2$ are as defined above and HB is a heterocyclic base, such as pyridine; alkylated pyridines, such as picolines, collidines and lutidines; quinolines; and the like. Thus, upon reacting the acetylated phenylhydantoin of cephalosporin C with pyridine in aqueous solution, the pyridinium derivative of the hydantoin of desacetoxy cephalosporin C is obtained.

These heterocyclic base derivatives are valuable modifications of the hydantoin compounds and possess enhanced bactericidal activity. These products are useful for the same purposes as the hydantoin derivatives of cephalosporin C.

The hydantoin derivatives of the present invention have enhanced bactericidal activity; being up to 100 times more active against various pathogenic bacteria than cephalosporin C. Thus, the pehnylthiohydantoin derivative was found to be 17 times more active in vitro against *S. aureus*, 3 times more active in vitro against *B. subtilis* and 12 times more active than cephalosporin C in mice infected with *S. aureus* Smith. The butylthiohydantoin was found to be about 75 times more active against *S. aureus* and about 8 times more active against *B. subtilis* than cephalosporin C. The phenylhydantoin was found to have about twice the activity of phenylthiohydantoin cephalospirin C in vitro against *S. aureus*. The pyridinium-desacetoxy derivative of this hydantoin is about 100 times as active as cephalosporin C against *S. aureus* Smith in vivo. The new hydantoin compounds are therefore useful bactericidal agents which can be utilized for the sterilization of equipment and for the separation of microorganisms. These products are also useful as germicides in areas contaminated with microorganisms resistant to other antibiotics.

The hydantoin and acylated hydantoin compounds of the present invention are also hereinafter named as derivatives of propylcephalosporin in accordance with accepted nomenclature. Thus, the phenylhydantoin of cephalosporin C is also referred to by the name 3-(3-phenylhydantoin-5-yl)-propylcephalosporin, the butylthiohydantoin by the name 3-(3-butyl-2-thiohydantoin-5-yl)-propylcephalosporin, and the formylated phenylhydantoin by the name 3-(1-formyl-3-phenylhydantoin-5-yl) propylcephalosporin.

The following examples are illustrative of the methods by which the new compounds of this invention can be prepared.

EXAMPLE 1

*3-(3-phenyl-2-thiohydantoin-5-yl)propylcephalosporin*

On g. of sodium salt of cephalosporin C is dissolved in 6–7 ml. of water with 200 mg. of sodium bicarbonate and diluted with 6 ml. of dioxane. To this stirred mixture is added .2 ml. of phenylisothiocyanate. Stirring is continued overnight at room temperature when the mixture is washed twice with ether and then acidified with 2.5 ml. of 2 N sulfuric acid. After three extractions with butanol, the aqueous layer is treated with an additional 1.5 ml. of 2 N sulfuric acid and extracted thoroughly with butanol. The butanol solution is washed twice with saturated sodium chloride solution, dried over anhydrous magnesium sulfate and concentrated to dryness in a rotating flash evaporator at a bath temperature of 30–40° C. to obtain the N-phenylcarbamyl derivative of cephalosporin C in the form of a solid. This solid is heated in 20–25 ml. of glacial acetic acid on the steam bath for 10–15 minutes. It is then centrifuged and the clear solution concentrated to dryness in a rotating flash evaporator at a bath temperature not higher than 30° C. The residue, containing traces of acetic acid, is treated with 30–40 ml. of dioxane and centrifuged to remove insoluble material. The dioxane solution is frozen and freeze dried to give 3-(3-phenyl-2-thiohydantoin-5-yl)propylcephalosporin as a light fluffy powder with a slightly yellowish caste exhibiting a maximum absorption at $$2670 \text{ A. } E_{1cm.}^{1\%} 380$$

Electrophoresis and circular paper chromatography with butanol, ethanol, water (4,1,5) system shows one spot with an $R_f$ about .54.

Slow evaporation of methanol or methanol and water solution of the phenylthiohydantoin yields a semi-crystalline product; M.P. 154–156° C. with dec. This material has an $$E_{1cm.}^{1\%}$$

of 446 at 2670 A. and 248 at 2270 A. The neutral equivalent in 50% methanol-water is 570; calculated 532.

EXAMPLE 2

3-(3-butyl-2-thiohydantoin-5-yl)propylcephalosporin

When butylisothiocyanate is reacted with the sodium salt of cephalosporin C and the resulting reaction product recovered in the same manner as described in Example 1, the N-butylthiocarbamyl derivative of cephalosporin C was obtained. Heating of this acid with acetate acid and recovery of the resulting hydantoin by the procedures of Example 1 yields 3-(3-butyl-2-thiohydantoin-5-yl) propylcephalosporin. Crystallization of this product from aqueous methanol affords crystals which melt at 154–156° C. after drying overnight. The crystalline product exhibits ultraviolet absorption maxima at $$3200 \text{ A. } (E_{1cm.}^{1\%} 14), 2660 \text{ A. } (E_{1cm.}^{1\%} 469)$$

and $$2370 \text{ A. } (E_{1cm.}^{1\%} 256)$$

and major bands at 5.60, 5.76, 6.60, 7.42 and 8.1 to 8.22$\mu$ in the infrared spectrum. Circular paper chromatogram of the butylthiohydantoin with butanol, ethanol and water (4,1,5) gives an $R_f$ of 0.58 to 0.60.

EXAMPLE 3

3-(3-methyl-2-thiohydantoin-5-yl)propylcephalosporin

Folowing the procedures described in Example 1 using methylisothiocyanate in place of phenylisothiocyanate, the N-methylthiohydantoin derivative of cephalosporin C and 3(3-methyl-2-thiohydantoin-5-yl)propylcephalosporin are obtained.

EXAMPLE 4

3-(3-heptyl-2-thiohydantoin-5-yl)propylcephalosporin

Following the procedures described in Example 1 using heptylisothiocyanate in place of phenylisothiocyanate, the N-heptylthiocarbamyl derivative of cephalosporin C and 3-(3-heptyl-2-thiohydantoin-5-yl)propylcephalosporin are obtained.

EXAMPLE 5

3-(1-acetyl-3-phenylhydantoin-5-yl)propylcephalosporin

Five g. of the sodium salt of cephalosporin C and 1 g. of sodium bicarbonate are dissolved in 30 ml. of water. 1.25 ml. of phenylisocyanate in 30 ml. of peroxide free dioxane is added and the reaction mixture stirred for 2 hours at 25° C. The reaction mixture is extracted with ether to remove a white precipitate of diphenylurea. The aqueous layer is acidified to pH 2 with 2 N $H_2SO_4$ to yield a white precipitate which is extracted into butanol. The butanol solution is extracted with sodium chloride solution, dried over sodium sulfate and concentrated to dryness in a high vacuum rotary flash evaporator at 30 to 40° C. bath temperature. The residue is triturated with ether to give the N-phenylcarbamyl derivative of cephalosporin C as a pale yellow solid. This product has an ultraviolet absorption shoulder at $$2610 \text{ A. } E_{1cm.}^{1\%} 119$$

peak at $$2395 \text{ A. } E_{1cm.}^{1\%} 377$$

The phenylhydantoic acid shows strong I.R. bands at 5.60; 5.75; 592; 6.45; 8.8; 8.12 and 9.0; weaker bands at 6.25; 6.68; 6.96; 7.25; 7.40 and 7.62$\mu$.

Activity in vivo against *S. aureus* is about 1/200 of that of sodium benzyl penicillin with a zone of inhibition of 17.6 mm. at 40$\gamma$/ml.

One gram of the carbamyl derivative is allowed to stand in 80 ml. of 25% acetic anhydride acetic acid mixture containing 2 ml. of pyridine for one hour. This is concentrated in a rotating flash evaporator at room temperature, acidified with sulfuric acid and extracted into butanol. The butanol solution of the phenylhydantoin is extracted with sodium bicarbonate solution to remove the acid from any lactone which may be formed during the ring closure reaction. The solution is then acidified with sulfuric acid and extracted with methyl isobutyl ketone which is washed with water and dried over magnesium sulfate. The sodium salt is precipitated by adding sodium 2-ethylhexanoate. This is filtered, dissolved in acetone and reprecipitated with ether. Crystallization of this precipitate from acetonitrile yields a crystalline sodium salt of 3-(1-acetyl-3-phenylhydantoin-5-yl) propylcephalosporin.

Material prepared in this way shows active zones against *S. aureus* at 5 to 10$\gamma$/ml. Thus, it has better than one-half the activity of the butyl thiohydantoin and 3 to 4 times the activity of phenyl thiohydantoin in vitro.

The acetylated phenylhydantoin has no peak at 2400 A. in the U.V. but has strong end absorption with a shoulder at 2550–2600 A. This is in contrast to the phenylhydantoic acid which has a strong maximum at 2400 A.

EXAMPLE 6

The N-phenylcarbamyl derivative of cephalosporin C 17 grams of the sodium salt of cephalosporin C is dissolved in 110 ml. of water with 3.4 g. of $NaHCO_3$ and clarified by filtration through diatomaceous filter aid. 110 ml. of purified dioxane is added and the stirred solution is treated dropwise with 5 ml. of phenylisocyanate (50% excess). After 5 minutes, precipitation of crystalline diphenyl urea occurs and after 15 minutes there is no longer any detectable odor of the isocyanate. The mixture is filtered and extracted three times with ether. The aqueous solution is treated with Darco G–60 and filtered through Fliter-Cel. The bright colored solution is carefully acidified with 50% sulfuric acid to about pH 2 with seeding as soon as turbidity occurs causing precipitation of the N-phenylcarbamyl derivative. The thick white crystalline mass is filtered off and washed free from sulfuric acid. It is dried under vacuum at room temperature. An analytical sample is prepared by recrystallization from acetone by spontaneous evaporation. The U.V. maximum is at $$239\mu, E_{1cm.}^{1\%} 411$$

with a shoulder at $$260\mu, E_{1cm.}^{1\%} 150$$

EXAMPLE 7

3-(1-acetyl-3-phenylhydantoin-5-yl)propylcephalosporin 4.1 grams of the recrystallized N-phenylcarbamyl derivative of cephalosporin C is dissolved in 75 ml. of acetic acid and treated with 25 ml. of acetic anhydride and 4 ml. of pyridine. After standing for one hour at 25° C. the mixture is concentrated to a syrup in a flask evaporator. It is then treated with ice water and carefully acidified to pH 2 with 2 N sulfuric acid and extracted with methylisobutyl ketone. The solvent is washed with water dried over sodium sulfate and concentrated to dryness to obtain the 3-(1-acetyl-3-phenylhydantoin-5-yl)propylcephalosporin in solid form. The concentrate is dissolved in 100 ml. of dry acetone and treated with potassium 2-ethylhexanoate. A small amount of precipitate is removed and the product is precipitated by the addition of 50 ml. of ether. This material appears to be crystalline and is recrystallized by dissolving it in a minimum amount of 10% aqueous acetone and allowing it to crystallize spontaneously. The potassium salt of 3-(1-acetyl-3-phenylhydantoin-5-yl) propylhydantoin in insoluble in dry acetone. It is characterized by $R_f$ 0.49 (butanol, ethanol, water: 4/1/5) and by U.V. absorption at $$260\mu, E_{1cm.}^{1\%} 141$$

with strong end absorption.

This product is $\frac{1}{35}$ as active as penicillin G by plate assay against *S. aureus*. It is 26–27 times as active as the parent N-phenylcarbamyl derivative and 50–75 times as active as cephalosporin C. Unlike penicillin G, this derivative of cephalosporin C retains most of its activity against resistant staphlococci.

In a typical tube dilution assay, the 24-hour minimum inhibiting concentrations against resistant strains are found to be: *S. aureus* Smith 1.98γ/ml., *S. aureus* 2957 (penicillin resistant) 3.98γ/ml., *S. aureus* 3051 (penicillin, streptomycin and tetracycline resistant) 3.98γ/ml., *D. pneumoniae* 0.48γ/ml. and *S. pyogenes* 0.97γ/ml.

The free acid form of this hydantoin derivative is obtained from the above methyl isobutyl ketone solution by the addition of ether. A semi-crystalline precipitate results which is recrystallized from acetone M.P. 182–183° C., $R_f$ ca. 0.58 in butanol/ethanol/water (4:1:5), infrared absorption bands at 5.58, 5.72, 5.83, 5.92, 6.47, 6.65, 7.12, 7.26, 7.38, 7.74 and 8.1μ (pyridine solution).

EXAMPLE 8

*3-(1-acetyl-3-butylhydantoin-5-yl)propylcephalosporin*

The N-buytlcarbamyl derivative of cephalosporin C is prepared by reacting 5 g. of cephalosporin C sodium salt with 1.2 ml. of butylisocyanate according to the procedure described in Example 6. The crystalline acid obtained by the procedures described in Example 6 absorbed in the ultraviolet at $$2620 \text{ A. } (E_{1cm.}^{1\%} 139)$$

with strong end absorption.

The carbamyl compound is converted to the sodium salt of 3-(1-acetyl-3-butylhydantoin-5-yl)propylcephalosporin following the procedure of Example 7. This sodium salt has an ultraviolet absorption at $$2560 \text{ A. } (E_{1cm.}^{1\%} 123)$$

with strong end absorption. By plate assay this compound is $\frac{1}{45}$ as active as penicillin G against *S. aureus*.

EXAMPLE 9

*3-[1-acetyl-3-(p-chlorophenyl)-hydantoin-5-yl]propylcephalosporin*

Following the procedures described in Example 5, the N-p-chlorophenylcarbamyl derivative of cephalosporin C is prepared by the reaction of p-chlorophenylisocyanate with the sodium salt of cephalosporin C. This acid exhibited strong ultraviolet absorption at $$2460 \text{ A. } (E_{1cm.}^{1\%} 520)$$

and $$2680 \text{ A. } (E_{1cm.}^{1\%} 141)$$

The hydantoic acid is converted to 3-[1-acetyl-3-(p-chlorophenyl)-hydantoin-5-yl]propyl cephalosporin by reaction with acetic anhydride.

In the same manner the N-p-fluorophenylcarbamyl derivative of cephalosporin C and the corresponding hydantoin compound are prepared. The carbamyl compound shows strong absorption at $$2370 \text{ A. } (E_{1cm.}^{1\%} 379)$$

and $$2650 \text{ A. } (E_{1cm.}^{1\%} 136)$$

and the hydantoin at $$2575 \text{ A. } (E_{1cm.}^{1\%} 129)$$

EXAMPLE 10

*Pyridinium-desacetoxy 3-(3-phenylhydantoin-5-yl)propylcephalosporin*

Ten grams of the crude acetylated phenylhydantoin derivative prepared as described in Example 5 is dissolved in 500 cc. of water and 75 cc. of pyridine. This solution is left at 37° for three days under nitrogen. Half of the water is then removed on a rotating evaporator and the remaining solution is extracted with butanol to remove gummy impurities. The water layer is taken completely to dryness on the evaporator at room temperature to give 5.48 g. of crude product.

This material is dissolved in 270 cc. of water with the aid of 12 cc. of pyridine. The solution is stirred for one hour with 42 g. of IRA–400 (HCO$_3$—) washed with 100 cc. of methylisobutyl ketone and lyopholized to give 1.17 g. of pale yellow, slightly hygroscopic solid. This is dissolved in 20 cc. of the lower phase of a n-butanol-glacial acetic acid-water system (volume ratio 4:1:4) and put in the first two tubes of a forty-tube Craig machine. After completion of the counter-current separation process, the contents of the tubes are lyopholized. The material from tubes No. 11–24 is homogeneous and is combined. This fraction has a single U.V.-absorbing spot ($R_f$ 0.60–0.64) on circular paper chromatography with the n-butanol-acetic acid-water system mentioned above. An excellent growth-inhibiting zone (vs. *B. subtilis*) also occurs at this $R_f$ and no other bioactive component is present. It is characterized by U.V. absorption at $$254\mu, E_{1cm.}^{1\%} 146 \text{ (water)}$$

and by I.R. absorption maxima at 5.66, 5.8, 6.0, 6.1–6.15, 6.42, 6.5, 6.63 and 7.05μ. There is no acetate band in the 8μ region.

In a typical 24-hour tube dilution assay, the above material inhibited *S. aureus* Smith at 0.97γ/ml., *S. aureus* 2957 (pencillin resistant) at 31.2γ/ml., *S. aureus* 3051 pencillin, streptomycin and tetracycline resistant) at 31.2γ/ml., *D. pneumoniae* at 0.48γ/ml., and *S. pyogenes* at 0.24γ/ml.

EXAMPLE 11

*3-(3-phenylhydantoin-5-yl)propylcephalosporin*

500 mg. of the N-acetyl-phenylhydantoin derivative of cephalosporin C are dissolved in 3 cc. of dioxane and 3 cc. of 1 N HCl. This solution is left at 37° for 6 hours. It is then diluted with water and extracted into butanol. The butanol solution is washed with sodium chloride solution, dried over sodium sulfate and concentrated under reduced pressure to yield a solid residue containing the 3-(3-phenylhydantoin-5-yl)propylcephalosporin.

EXAMPLE 12

*3-(1-acetyl-3-phenyl-2-thiohydantoin-5-yl) propylcephalosporin*

One gram of sodium salt of cephalosporin C is converted to the crude N-phenylcarbamyl derivative of cephalosporin C in Example 1. This product after drying in vacuo is reacted for one hour at room temperature with 80 ml. of 25% acetic anhydride-acetic acid mixture containing 2 ml. of pyridine. The resulting reaction mixture is then concentrated on a rotating evaporator at room temperature, acidified with sulfuric acid and extracted into butanol. The washed and dried butanol is removed to yield a residue containing the 3-(1-acetyl-3-phenyl-2-thiohydantoin-5-yl)propylcephalosporin.

EXAMPLE 13

*Pyridinium-desacetoxy-3-(3-phenyl-2-thiohydantoin-5-yl) propylcephalosporin*

Ten grams of the crude phenylthiohydantoin derivative of cephalosporin C are reacted with aqueous pyridine and the resultant reaction products purified following the procedures described in Example 10 to produce pyridinium-desacetoxy - 3 - (3 - phenyl-2-thiohydantoin-5-yl) propylcephalosporin.

EXAMPLE 14

Following the procedure described in detail in Example 13 above, and using pyridine, collidine, lutidine, quinoline and acridine in place of pyridine as the heterocyclic base, there is produced the corresponding heterocyclic base desacetoxy thiohydantoin compounds.

Various changes and modifications of the invention can be made and, to the extent that such variations incorporate the spirit of this invention, they are intended to be included within he scope of the appended claims.

What is claimed is:

1. 3 - ( 3- phenyl-2-thiohydantoin-5-yl)propylcephalosporin.
2. 3 - (3 - butyl - 2-thiohydantoin-5-yl)propylcephalosporin.
3. 3 - (3 - methyl-2-thiohydantoin-5-yl)propylcephalosporin.
4. 3 - (3 - heptyl-2-thiohydantoin-5-yl)propylcephalosporin.
5. 3-(3-phenylhydantoin-5-yl)propylcephalosporin.
6. A hydantoin derivative of cephalosporin C from the group consisting of compounds of the formula:

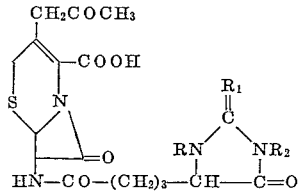

wherein R is a member from the group consisting of hydrogen and lower alkanoyl, $R_1$ is a member from the group consisting of oxygen and sulfur, and $R_2$ is a member from the group consisting of lower alkyl, phenyl, and p-chlorophenyl and salts thereof.

7. A hydantoin derivative of cephalosporin C having the structural formula:

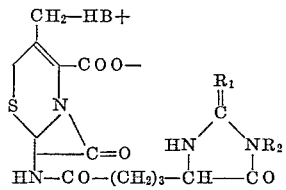

wherein HB represents a heterocyclic base from the group consisting of pyridine, collidine, lutidine, quinoline and acridine, $R_1$ is a member from the group consisting of oxygen and sulfur and $R_2$ is a member from the group consisting of lower alkyl, phenyl and p-chlorophenyl.

8. A process which comprises reacting an N-carbamyl derivative of cephalosporin C of the formula:

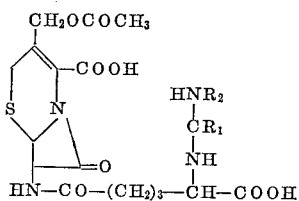

wherein $R_1$ is a member from the group consisting of oxygen and sulfur, $R_2$ is a member from the group consisting of lower alkyl, phenyl and p-chlorophenyl with an acid anhydride of a lower alkanoic acid to produce the corresponding hydantoin of the formula:

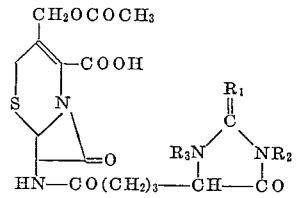

wherein $R_1$ and $R_2$ are the same as above, and $R_3$ represents a lower alkanoyl group.

References Cited by the Examiner

UNITED STATES PATENTS 3,117,129   1/1964   Hoover et al. _____ 260—248

OTHER REFERENCES

Abraham et al.: Ciba Foundation Symposium, Amino Acids and Peptides with Antimetabolic Activity, pages 205–223, pages 212–215 relied on (1958).

Bergman: The Chemistry of Acetylene and Related Compounds, page 80 (1948).

Hale: Brochemical Journal, vol. 79, pages 403–408 (1961).

Morton: The Chemistry of Heterocyclic Compounds, page VI of the preface, 1946.

Wertheim: Textbook of Organic Chemistry, pages 763–764 (1945).

NICHOLAS S. RIZZO, *Primary Examiner.*

JAMES W. ADAMS, *Assistant Examiner.*